(12) United States Patent
Smith

(10) Patent No.: US 6,249,733 B1
(45) Date of Patent: Jun. 19, 2001

(54) AUTOMATIC ENGINE RETARDER AND TRANSMISSION CONTROL IN OFF HIGHWAY EARTH MOVING EQUIPMENT

(75) Inventor: Jerry F. Smith, Clinton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/324,293

(22) Filed: Jun. 2, 1999

(51) Int. Cl.[7] .................................................. G06F 7/70
(52) U.S. Cl. ........................... 701/50; 701/53; 477/92; 477/183; 477/185; 477/205; 477/71; 475/118
(58) Field of Search ...................... 701/50, 53, 61, 701/66, 70; 477/71, 78, 91, 124, 173, 200, 118, 146, 144, 161, 109, 92, 107, 111, 86, 182–187, 205–209; 475/116, 109, 118, 121–122; 303/139, 174; 188/2 R, 4 B, 140 A; 192/3.23, 3.3, 3.25, 216, 3.34, 13 R; 74/733.1, 339, 335, 336 R, 478, 480 R

(56) References Cited

U.S. PATENT DOCUMENTS

| Re. 36,007 | | 12/1998 | White et al. ........................... 477/91 |
|---|---|---|---|
| 3,931,870 | * | 1/1976 | Memmer ............................... 188/296 |
| 4,050,556 | * | 9/1977 | Forster et al. ........................ 477/182 |
| 4,108,269 | * | 8/1978 | Nakao ................................... 180/168 |
| 4,753,134 | * | 6/1988 | Hayasaki .............................. 477/119 |
| 5,270,934 | | 12/1993 | Kobayashi ............................. 701/95 |
| 5,409,432 | * | 4/1995 | Steeby .................................... 477/71 |
| 5,537,975 | | 7/1996 | Cosma et al. ........................ 123/322 |
| 5,830,105 | * | 11/1998 | Iizuka .................................... 477/92 |
| 5,910,069 | * | 6/1999 | Markyvech .......................... 477/109 |
| 6,079,622 | * | 6/2000 | Chakraborty et al. ............... 180/169 |

* cited by examiner

Primary Examiner—Jacques H. Louis-Jacques
(74) Attorney, Agent, or Firm—R. Carl Wilbur

(57) ABSTRACT

An automatic control for operating an engine retarder, service brakes, and an automatic transmission associated with earth moving equipment is provided. The automatic control monitors engine speed and responsively produces control signals to maintain engine speed within predetermined limits.

9 Claims, 3 Drawing Sheets

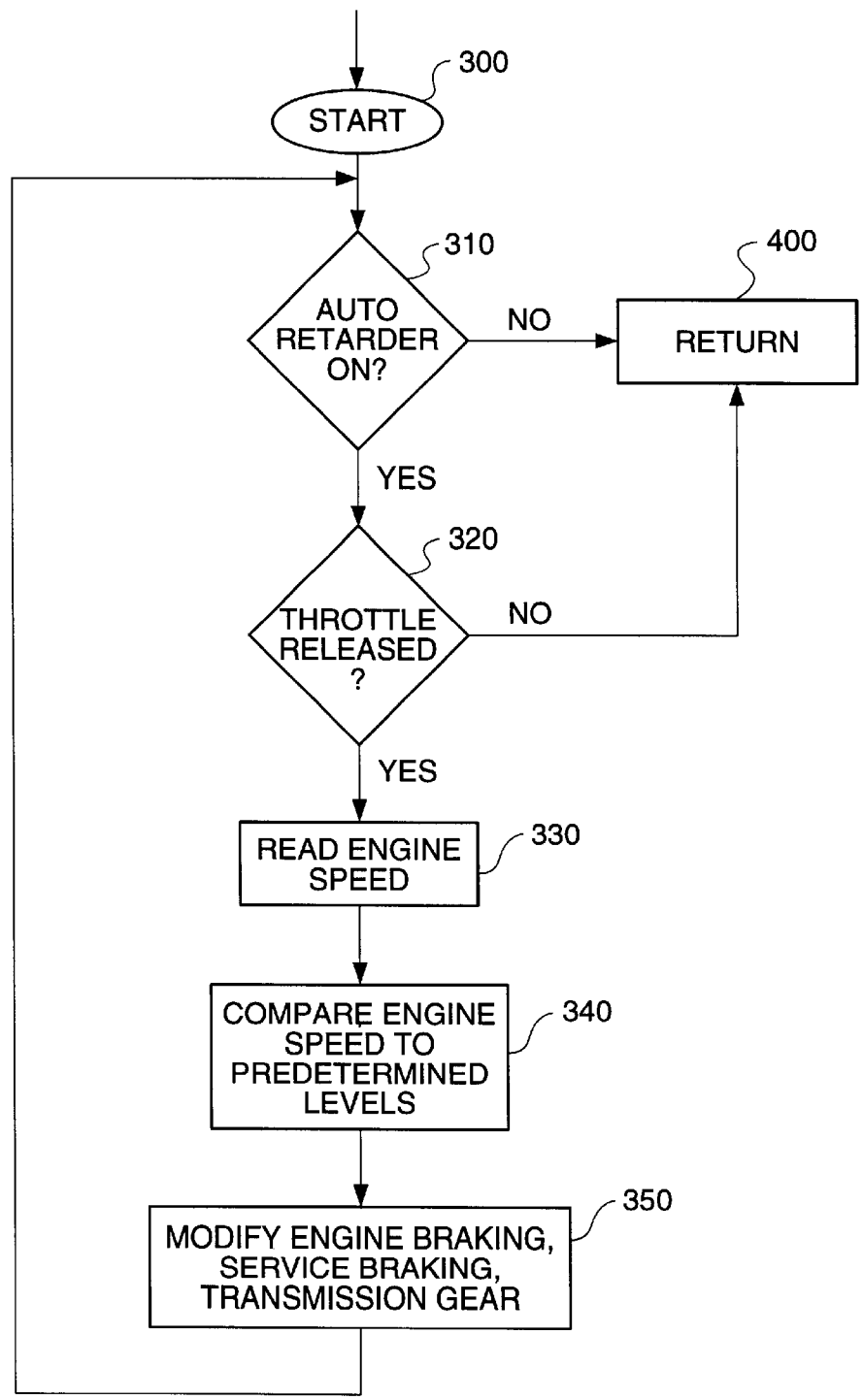

US 6,249,733 B1

AUTOMATIC ENGINE RETARDER AND TRANSMISSION CONTROL IN OFF HIGHWAY EARTH MOVING EQUIPMENT

TECHNICAL FIELD

The present invention relates to engine and transmission controls, and more particularly, to engine and transmission controls that automatically retard vehicle speed on off highway earth moving equipment.

BACKGROUND ART

Large mining and construction trucks have different driving characteristics than on-highway vehicles. One primary difference results from the size and mass of the truck. For example, many trucks now in production have a haul capacity of 370 tons. When operating a truck with this much mass it is important to control its speed especially when travelling down a grade.

Large mining and construction trucks are expensive to maintain if not operated properly. To reduce the wear on a truck's service brakes an experienced operator will use the transmission and engine to retard vehicle speed when travelling down an incline. Thus, when an experienced operator approaches an incline the operator will determine an appropriate gear based on the apparent grade of the slope and downshift into that gear. Then, when the truck enters the incline, the transmission and engine will create a retarding effect that will help prevent the truck from increasing speed and thereby requiring the operator to apply the service brakes to maintain the desired vehicle speed. If the operator chooses an inappropriate gear or the grade of the slope increases, the vehicle speed may begin to increase. An experienced operator will apply the service brakes to decrease engine speed to a shift point and downshift to the next lowest or a lower appropriate gear. Less experienced operators may use the service brakes to maintain a desired vehicle speed, which will reduce the life of the service brakes and increase the operating cost of the truck.

It would be preferable to have a system that could automatically operate the vehicle to control vehicle speed while travelling down an incline, in a manner approximating the effects of an experienced operator.

DISCLOSURE OF THE INVENTION

In one aspect of the present invention, an engine control system is provided for automatically controlling an engine retarder and providing signals to control a transmission on the vehicle. The engine control system includes an engine controller connected with an engine speed sensor, an automatic retarder enable switch, a throttle position sensor, an engine brake, vehicle service brakes, and a transmission controller. The engine controller automatically produces engine braking, vehicle service braking and transmission signals as a function of input signals received from input sensors.

These and other aspects and advantages of the present invention will become apparent to those skilled in the art upon reading the detailed description in connection with the drawings and appended claims.

BRIEF DESCRIPTION OF THE DRAWINGS

FIG. 3 shows a block diagram of software code implemented in a preferred embodiment of the present invention.

BEST MODE FOR CARRYING OUT THE INVENTION

Figure 1:
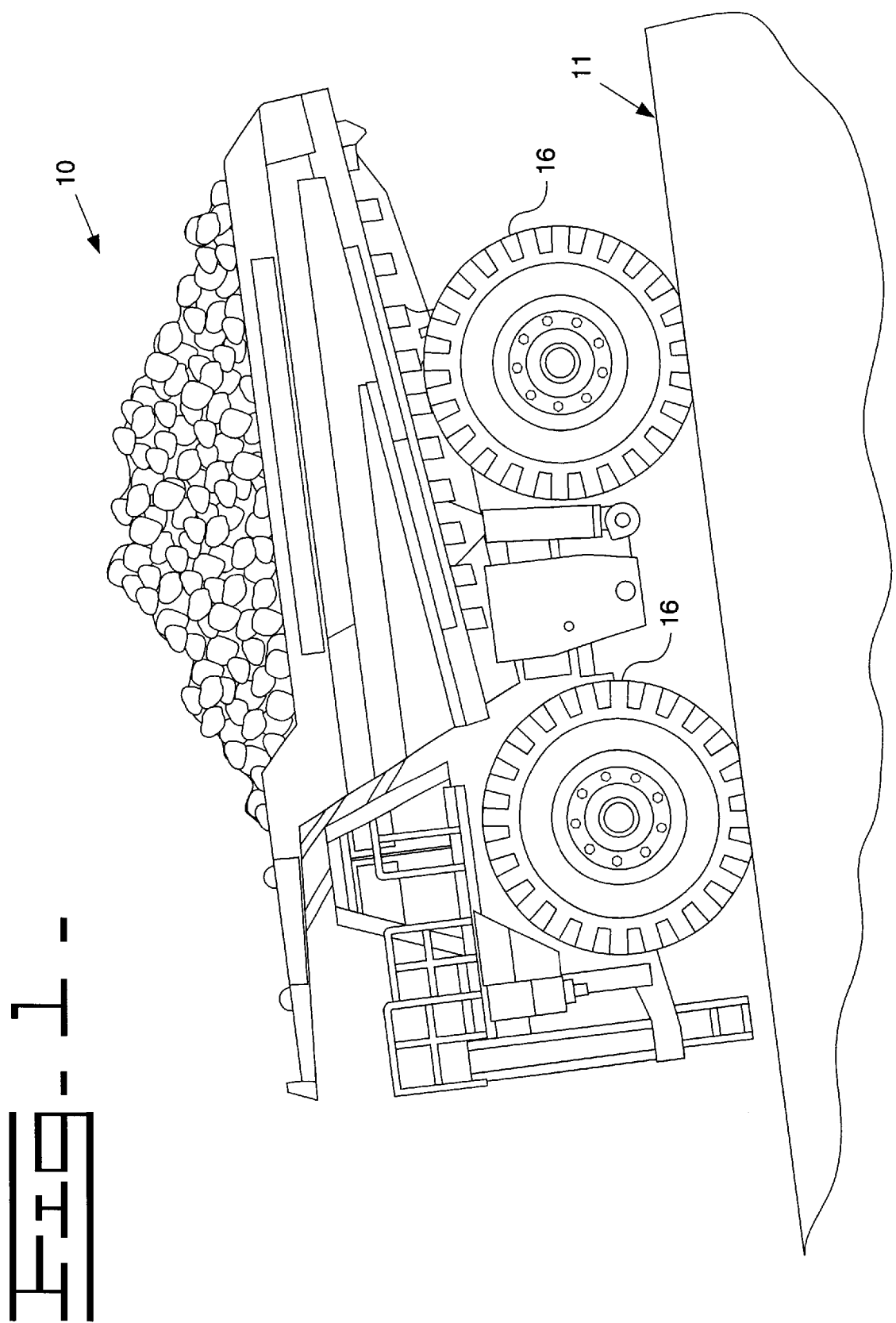
FIG. 1 shows an elevational view of a work machine which incorporates features of the present invention.

While the invention is susceptible to various modifications and alternative forms, a specific embodiment thereof has been shown by way of example in the drawings and will herein be described in detail. It should be understood, however, the invention is not limited solely to the specific form disclosed, but on the contrary, covers all modifications, equivalents, and alternatives falling within the spirit and scope of the invention as defined by the appended claims.

Figure 2:
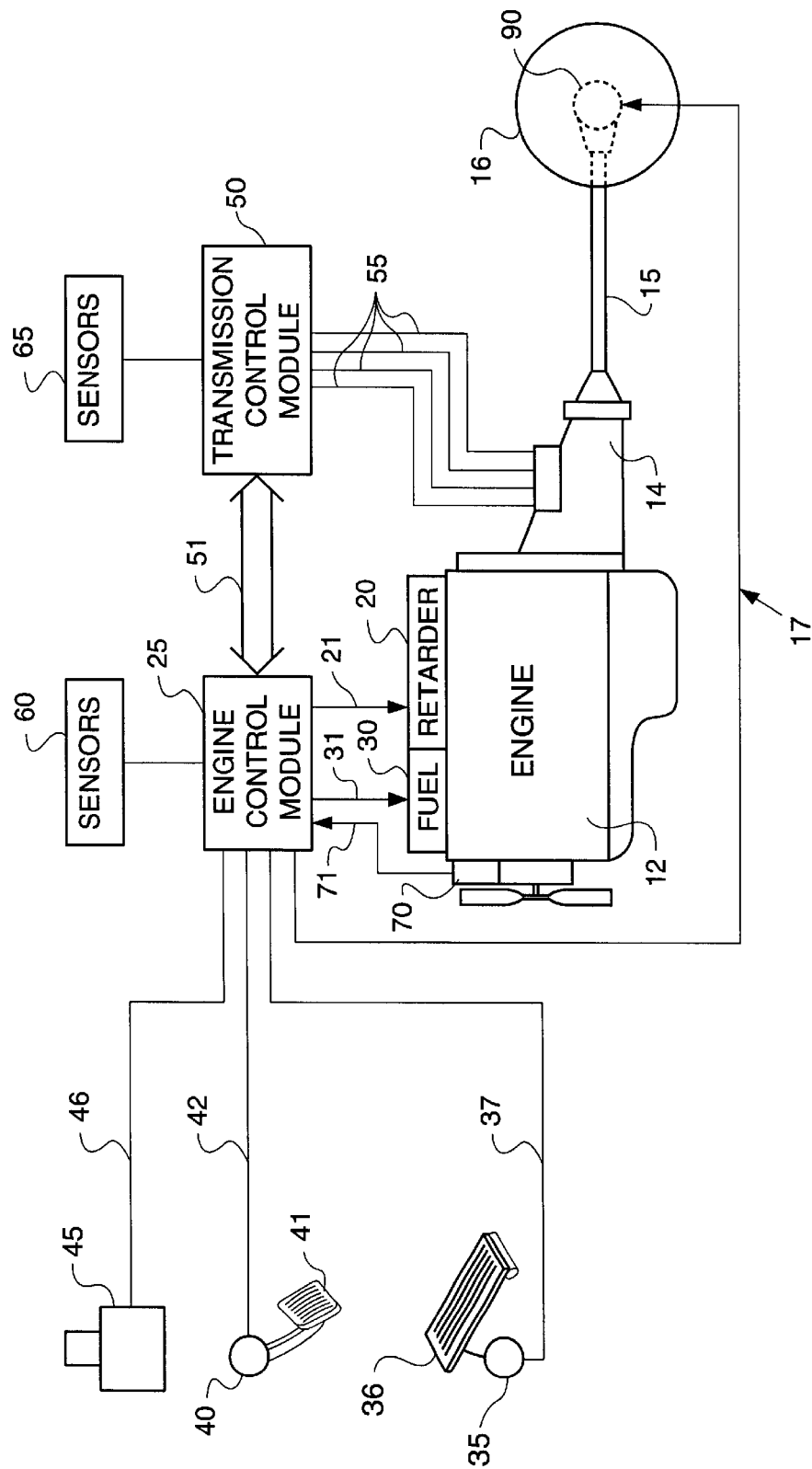
FIG. 2 shows a system level block diagram of various components of a preferred embodiment of the invention which are incorporated into the work machine of FIG. 1.

Referring now to FIG. 1, there is shown a work machine such as an off-highway truck 10. The off-highway truck 10 includes wheel assemblies 16 which contact a road surface 11 to permit the truck to move over the surface. The rear wheel assemblies are typically connected with an engine through a transmission. As shown in FIG. 2, a preferred embodiment of the present invention employs an internal combustion engine 12, such as a compression ignition engine 12 which is operatively coupled to a transmission 14. The engine 12 provides the motive power for operation of the off-highway truck 10. In particular, the engine 12 drives the transmission 14 which is in turn coupled to a drive train 15 associated with the truck 10 so as to drive a wheel assembly 16 of the truck 10 thereby facilitating advancement thereof. Each of the wheels included in the wheel assembly 16 preferably includes service brakes 90 operatively associated therewith in order to control the rotational velocity of the wheel assembly 16 and thereby control the ground speed of the off-highway truck 10. In a preferred embodiment the service brakes 90 comprise disc brakes. However, other embodiments may include other forms of service brakes, such as drum brakes, without deviating from the scope of the present invention as defined by the appended claims.

In order to facilitate retarding of the truck 10, the truck includes an engine retarder 20, which operates in a conventional manner. As is known to those skilled in the art, an engine retarder 20 typically provides various levels of engine braking force depending on, among other things, the number of engine cylinders being used for braking. For example, if the internal combustion engine being used has twelve engine cylinders then the engine retarder could provide: an intermediate level of braking force by using eight engine cylinders for braking; a lower level of engine braking by using four engine cylinders; or a higher level of braking using twelve cylinders for engine braking. Of course the actual number of cylinders used could deviate from the specific numbers given above without deviating from the present invention. The braking level is controlled by a signal produced by an engine control module 25 which is transmitted to the engine retarder over a conductive path 21. The engine control module determines which of the engine braking levels will be commanded according to program control discussed more fully below.

The engine control module 25 includes various input/output protection and signal conditioning circuitry, which is not shown in the figure, but which is well known to those skilled in the art. Also included in the engine control module 25 is a microprocessor or microcontroller which is connected with memory devices through a communication bus. The memory includes both data storage and programming instructions for performing a preferred embodiment of the program control associated with a preferred embodiment of the present invention.

As shown in FIG. 2, the electronic controller is connected to a fuel delivery system 30 through a conductive path 31, to a throttle position sensor 35 associated with a throttle pedal 36 through a conductive path 37, and to a service brake position sensor 40 associated with a service brake pedal 41 through a conductive path 42. The service brake and the throttle pedal are typically located within an operator compartment and are actuated by the operator to control the level of braking force provided by the service brakes and the amount of engine power produced and transmitted to the wheel assemblies 16. For example, if the operator desires more power to be transmitted to the rear wheel assemblies 16, the operator will typically depress the throttle pedal 36 further causing the throttle position signal produced by the throttle position sensor 35 on conductive path 37 to change. The engine control module 25 thereafter will modify the fuel delivery signal produced on conductive path 31 to cause the fuel delivery system 30 to increase fuel delivery to the engine 12, thereby increasing the power output of the engine 12. In a similar manner, the operator can increase the braking force produced by the service brakes by depressing (or further depressing) the service brake pedal 41, which will cause the engine control module 25 to modify a signal produced on conductive path 17 to cause the service brakes 90 to increase braking force.

Also connected with the engine control module 25 is an engine speed sensor 70 that produces an engine speed signal on conductive path 71. The engine speed sensor can be one of many types currently available in the industry. The electronic control module is also connected with an automatic retarder enable switch 45 through a conductive path 46. Preferably the automatic retarder switch is a switch having at least two positions, a first position in which automatic retarding and transmission control is disabled and a second position in which automatic retarding and transmission control is enabled.

In a preferred embodiment, the engine control module 25 communicates with a transmission control module 50 over a communications bus 51 or similar connection. In a preferred embodiment, the communications bus is a Caterpillar Datalink which satisfies the requirements specified in the SAE J1587 protocol. The transmission control module 50 develops shift signals over various conductive paths 55 which control actuators associated with the transmission 14. The shift signals control the actuators, which in turn control the effective gear ratio of the transmission. As will be apparent to those skilled in the art, although the sensors and actuators necessary for implementing a preferred embodiment of the present invention have been described herein, other types of sensors/actuators 60,65 may be connected with the engine control module 25 and the transmission control module 50, respectively, without deviating from the scope of the present invention.

Referring now to FIG. 3, a preferred embodiment of the software control is illustrated in the flowchart show therein. Those skilled in the art can readily and easily implement the software instructions from the flowchart using the specific instruction set associated with the microprocessor or microcontroller used in connection with the engine control module 25. Program control begins in block 300 and passes to block 310.

In block 310, the engine controller determines whether the automatic retarder enable switch 45 is in the first or second position. If the retarder switch is in the second position, corresponding to an automatic retarder mode in which automatic engine retarder and transmission control is enabled, then program control passes to block 320. Otherwise, if the automatic retarder enable switch is in the first position then the system is not in the automatic retarder mode, and program control passes to block 400 where program control returns to a main program.

In block 320, the electronic control module 25 reads the throttle position signal produced by the throttle position sensor 35 on conductive path 37. If the throttle position signal indicates that the operator has released the throttle and is therefore not requesting power output from the engine 12, then program control passes to block 330. Otherwise, if the throttle position signal indicates that the operator is pressing the throttle pedal and thereby requesting power output from the engine 12, then program control passes to block 400, where it returns to the main program. In a preferred embodiment, the electronic control module determines that the operator is not requesting power output from the engine 12 by comparing the throttle position signal to a predetermined throttle value and verifying that the throttle position signal is less than the predetermined throttle value.

In block 330, the electronic control module 25 reads the engine speed signal produced by the engine speed sensor 70 on conductive path 71. Program control then passes to block 340.

In block 340, the electronic control module 25 preferably compares the engine speed signal to a first, second and third predetermined engine speed level. Although a preferred embodiment of the present invention includes three predetermined engine speed levels, it should be recognized by those skilled in the art that a greater of fewer number of predetermined levels could be used without deviating from the scope of the present invention. In a preferred embodiment, the first predetermined engine speed level is 1600 RPM, the second predetermined engine speed level is 2200 RPM, and the third predetermined engine speed level is 2400 RPM. Those skilled in the art will recognize that other values could be readily and easily substituted for these specific values without deviating from the scope of the present invention as defined by the appended claims. The electronic control module 25 will compare the actual engine speed, as reflected by the engine speed signal, to these values. Program control then passes to block 350.

In block 350, the electronic control module 25 evaluates the comparison performed in the preceding block and may take some action with respect to the service brakes, engine brake or transmission gear ratio based on the comparison. In a preferred embodiment, if the actual engine speed exceeds the second predetermined engine speed level, then the electronic control module 25 will issue a signal on conductive path 21 to cause the retarder 20 to begin engine braking. In a preferred embodiment the engine braking would be applied at the highest level. If, on the other hand, the actual engine speed is less than the first predetermined engine speed level then the electronic controller will reduce the level of engine speed retarding, or if there is no retarding or the level of retarding is at the lowest level, then the electronic controller will turn the retarder 20 off. In this manner, if the vehicle 10 begins to travel too quickly and thereby exceeds the second predetermined engine speed level, then the electronic controller will automatically cause the retarder to perform engine braking at the highest level in an attempt to reduce the speed. Likewise, if the vehicle speed is too slow, the electronic controller will decrease the engine braking force. Program control then passes back to block 310.

Program control then proceeds through blocks 310 and 320 to verify that the switch 45 and throttle are in a position in which automatic retarding and transmission control is permitted, and then passed blocks 330 and 340 where engine speed is read and compared with the first, second, and third engine speed levels. Program control then returns block 350 where the electronic control module 25 will again make control decisions based on the most recent comparison in block 340. If the retarder is already providing maximum engine braking force, and the engine speed exceeds the third predetermined engine speed level then the electronic control module 25 issues a signal over conductive path 17 to cause the service brakes 90 to activate thereby slowing the vehicle 10. When the vehicle reaches an appropriate speed, the electronic control module then issues a command to the transmission control module 50 over conductive path 51 to cause the transmission control module 50 to issue signals over conductive paths 55 to downshift the transmission. Program control then returns to block 310.

INDUSTRIAL APPLICABILITY

In this manner, the electronic control module 25 automatically controls the speed of the earth moving equipment travelling down an incline without excessively applying the service brakes. When the engine exceeds a predetermined speed, the controller applies a braking force by activating the retarder. If engine speed nevertheless increases and exceeds a third predetermined value, the control module applies the service brakes 90 and downshifts the transmission 14. If on the other hand the engine speed falls below a first predetermined value, the electronic control module 25 decreases engine braking. If the engine speed remains less than that value then the control module 25 will continue to decrease engine braking until there is no engine braking produced by the retarder.

Those skilled in the art will recognize that the present invention permits an unskilled operator to operate the off highway truck in a manner which reduces the reliance on the service brakes as a means of vehicle speed control. By reducing the reliance on service brakes an embodiment of the present invention is able to reduce the overall maintenance costs of the vehicle.

What is claimed is:

1. A method for operating earth moving equipment equipped with an electronic controller, an engine retarder, service brakes and a transmission, said method comprising;
   determining whether automatic retarding is enabled;
   measuring actual engine speed;
   engaging said engine retarder in response to said automatic retarder being enabled and said actual engine speed exceeding a second predetermined level;
   automatically applying service brakes and downshifting a transmission gear ratio in response to said engine speed exceeding a third predetermined level;
   decreasing engine braking force of said engine retarder in response to said engine speed falling below a first predetermined level.

2. The method of claim 1, wherein said step of determining includes verifying the position of a retarder enabled switch and the position of a throttle.

3. The method of claim 2, wherein said step of determining further includes verifying said retarder enabled switch is in an on position and said throttle is released.

4. The method of claim 1, wherein said step of applying includes downshifting in response to a programmable predetermined level.

5. A method of controlling a work vehicle, said method comprising:
   determining the status of a retarder switch;
   determining the position of a throttle pedal;
   determining an engine speed;
   comparing said engine speed to predetermined engine speed levels; and
   computing an engine retarding, service braking and transmission gear ratio signals in response to said engine speed comparison when said retarder switch status has a first predetermined characteristic and said throttle pedal position has a second predetermined characteristic.

6. The method according to claim 5, wherein said work vehicle includes a first, second, and third engine braking levels.

7. An apparatus for controlling the speed of work equipment, said apparatus comprising:
   an engine having an engine speed sensor;
   an electronic controller connected with said engine speed sensor;
   an automatic retarder enable switch connected with said electronic controller;
   a brake sensor associated with a brake pedal, said brake sensor connected with said electronic controller;
   a throttle sensor associated with a throttle of said work equipment, said throttle sensor producing a throttle position signal and being connected with said electronic controller;
   an engine retarder associated with said engine and connected with said electronic controller;
   said electronic controller connected with a transmission, service brakes, and said retarder, said electronic controller controlling said transmission, service brakes and retarder as a function of inputs from said automatic retarder enable switch, said brake sensor, said throttle sensor, and said engine speed sensor.

8. The method of claim 1 wherein the earth moving equipment includes an engine having a first plurality of cylinders, and wherein engaging said engine retarder comprises stopping the delivery of fuel to a second plurality of the cylinders.

9. The method of claim 8 wherein the second plurality is less than the first plurality.

* * * * *